United States Patent
Gannon et al.

(10) Patent No.: US 10,318,003 B2
(45) Date of Patent: Jun. 11, 2019

(54) SYSTEM AND METHOD FOR PROVIDING AIRCRAFT AUTOFLIGHT CAPABILITY FEEDBACK TO A PILOT

(71) Applicant: HONEYWELL INTERNATIONAL INC., Morris Plains, NJ (US)

(72) Inventors: Aaron Gannon, Anthem, AZ (US); Ivan Sandy Wyatt, Scottsdale, AZ (US); Steve Grothe, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 166 days.

(21) Appl. No.: 15/095,310

(22) Filed: Apr. 11, 2016

(65) Prior Publication Data
US 2017/0293358 A1 Oct. 12, 2017

(51) Int. Cl.
G06F 3/01 (2006.01)
G05D 1/10 (2006.01)
G06F 3/14 (2006.01)
G01C 23/00 (2006.01)
G06F 3/0484 (2013.01)

(52) U.S. Cl.
CPC .......... G06F 3/016 (2013.01); G01C 23/005 (2013.01); G05D 1/101 (2013.01); G06F 3/14 (2013.01); G06F 3/04842 (2013.01)

(58) Field of Classification Search
CPC ......... G01C 23/005; G06F 3/14; G06F 3/016; G06F 3/04842; G05D 1/101
See application file for complete search history.

(56) References Cited

U.S. PATENT DOCUMENTS

| 8,374,732 | B2 | 2/2013 | Vial | |
|---|---|---|---|---|
| 8,665,121 | B2 | 3/2014 | Shavit | |
| 2013/0211635 | A1* | 8/2013 | Bourret | B64C 19/00 701/14 |
| 2017/0255257 | A1* | 9/2017 | Tiana | G06F 3/012 |
| 2017/0272701 | A1* | 9/2017 | King | H04N 7/181 |

FOREIGN PATENT DOCUMENTS

| EP | 2544163 A2 | 1/2013 |
|---|---|---|
| WO | 2016035002 A1 | 3/2016 |

OTHER PUBLICATIONS

Flaps 2 Approach—Boeing 737 Simulation Project; B737-800 NG Flight Mode Annunciator (FMA); Sep. 2014.
Novacek P.; Flaps 2 Approach—Boeing 737 Simulation Project; Design Displays for Better Pilot Reaction; Oct. 2003.
Extended EP Search Report for Application No. 17161151.0-1557 dated Sep. 13, 2017.
EP Examination Report for Application No. 17161151.0 dated Jun. 8, 2018.

* cited by examiner

*Primary Examiner* — Stacy Khoo
(74) *Attorney, Agent, or Firm* — Lorenz & Kopf, LLP

(57) ABSTRACT

A system and method provides aircraft autoflight capability feedback to aircraft pilots to thereby prevent, or at least inhibit, latent errors of omission that may result in operational errors. The system and method uses graphics that communicate subtly and in the background, in a manner that naturally fits with how the visual cortex processes graphical information and how the mind makes quick, and subconscious judgments about information. The system may also use auditory and tactile feedback.

7 Claims, 3 Drawing Sheets

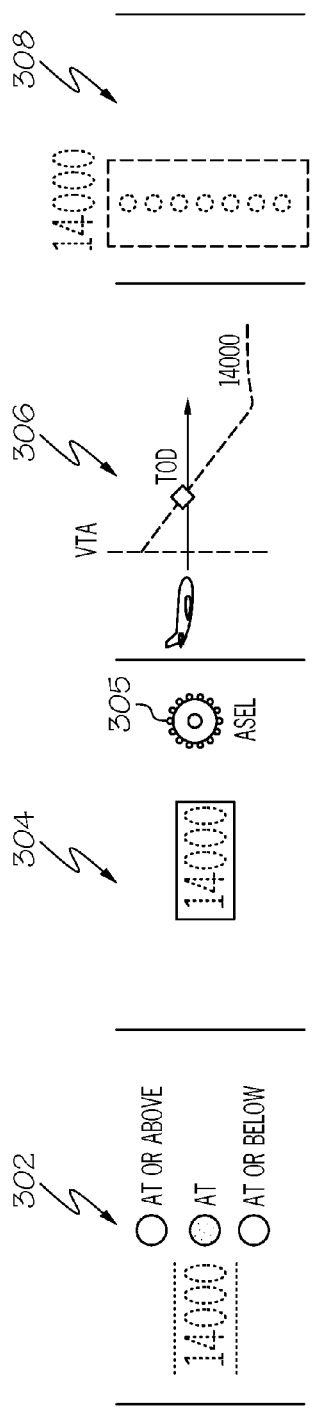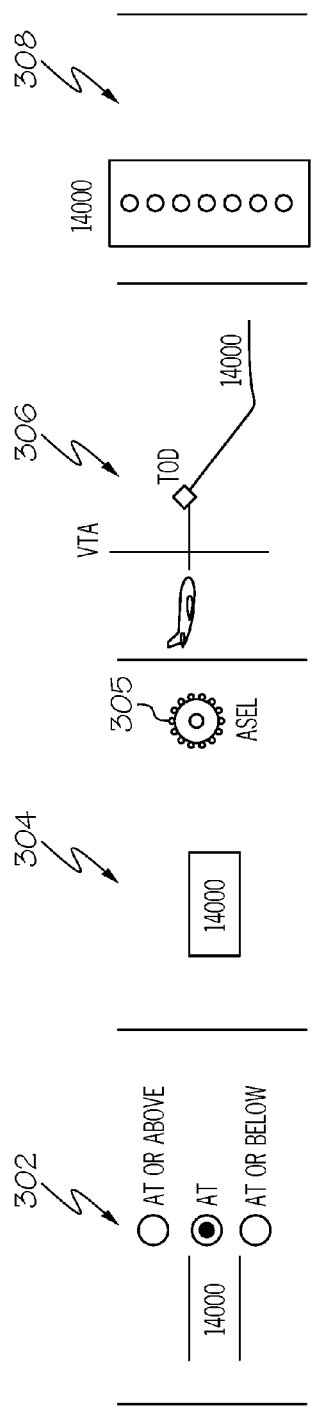

SYSTEM AND METHOD FOR PROVIDING AIRCRAFT AUTOFLIGHT CAPABILITY FEEDBACK TO A PILOT

TECHNICAL FIELD

The present invention generally relates to providing feedback to aircraft pilots, and more particularly relates to systems and methods for providing aircraft autoflight capability feedback to pilots.

BACKGROUND

Numerous aircraft avionic systems, such as autoflight and flight management systems, are replete with numerous operational modes. The permutations of these operational modes can cause some uncertainty as to what these systems are presently doing and/or what these systems may do next. To assist in alleviating this uncertainty, most aircraft include a display called the Flight Mode Annunciator (FMA).

The basic functionality of the FMA has not changed in over 50 years. For complex path management in the modern National Airspace System (NAS), the FMA may not reveal enough information, quickly enough, to ensure pilots do not make a path error. Moreover, the FMA design does not naturally communicate what aircraft systems will NOT do. This can cause errors of omission, which can result in operational deviations, because the system didn't do (or communicate about) something it half-knew it was supposed to do. For instance, in modern commercial aircraft, the likelihood of missing a descent target is increased.

In most systems, regardless of manufacturer or implementation (e.g., graphical or through an MCDU), setting a descent target requires the pilot to perform a 3-step process. First, the constraint at a given waypoint is set. Second, the altitude target is set via, for example, the ASEL (altitude select), which gives the aircraft "permission" to descend. Third, and finally, the vertical navigation (VNAV) function is armed. Completion of any one of these steps may make the pilot feel that they have completed the process. However, because only one step of the process is completed, the aircraft will not maneuver to the descent target. Because the system is not configured to provide aircraft autoflight capability feedback to pilots (e.g., reveal what the aircraft will do and what it will not do), the latent error of omission is hidden from view until it becomes an operational error.

Hence, there is a need for a system and method of providing aircraft autoflight capability feedback to pilots to aircraft pilots to thereby prevent, or at least inhibit, latent errors of omission that may result in operational errors. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing aircraft autoflight capability feedback to a pilot includes a plurality of display devices, a user interface, and a processor. Each display device is configured to render images in a nominal resolution and a degraded resolution, where the degraded resolution is less than the nominal resolution. The user interface is configured to receive user input representative of a flight constraint value. The processor is in operable communication with the display devices and the user interface, and is coupled to selectively receive a first enable signal indicating a constraint selection function has been enabled and a second enable signal indicating that an autoflight armed function has been enabled. The processor configured to: determine when a flight constraint value has been entered via the user interface, determine which images rendered on one or more of the display devices are associated with the entered flight constraint value, command one or more of the display devices to render at least portions of the images associated with the flight constraint value in the degraded resolution, determine when both the first enable signal and the second enable signal have been received, and command the one or more of the display devices to render the images associated with the flight constraint value in the nominal resolution only when both the first enable signal and the second enable signal have been received.

In another embodiment, a method for providing aircraft autoflight capability feedback to a pilot via display devices that render images in a nominal resolution includes determining, in a processor, when a flight constraint value has been entered via a user interface, determining, in the processor, which images, rendered on one or more of the display devices, are associated with the flight constraint value, rendering, on the one or more of the display devices, at least portions of the images associated with the flight constraint value in a degraded resolution, the degraded resolution being less than the nominal resolution, determining, in the processor, if both a constraint selection function and an autoflight armed function have been enabled, and rendering, on the one or more of the display devices, the images associated with the flight constraint value in the nominal resolution only when it is determined that both the constraint selection function and the autoflight armed function have been enabled.

In yet another embodiment, a system for providing aircraft autoflight capability feedback to a pilot includes a plurality of display devices, a first user interface an altitude select (ASEL) function, a vertical navigation (VNAV) select function, and a processor. Each display device is configured to render images in a nominal resolution and a degraded resolution, where the degraded resolution less than the nominal resolution. The first user interface is configured to receive user input representative of a flight constraint value. The ASEL function is configured to supply a first enable signal indicating a constraint selection function has been enabled. The VNAV select function is configured to supply a second enable signal indicating that an autoflight armed function has been enabled. The processor is in operable communication with the display devices and the user interface, and is coupled to selectively receive the first enable signal and the second enable signal. The processor is configured to: determine when a flight constraint value has been entered via the user interface, determine which images rendered on one or more of the display devices are associated with the entered flight constraint value, command one or more of the display devices to render at least portions of the images associated with the flight constraint value in the degraded resolution, determine when both the first enable signal and the second enable signal have been received, and command the one or more of the display devices to render the images associated with the flight constraint value in the nominal resolution only when both the first enable signal and the second enable signal have been received.

Furthermore, other desirable features and characteristics of the aircraft autoflight capability feedback system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 3 and 4 graphically depict one instantiation of the process of FIG. 2, that may be implemented by the system of FIG. 1.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
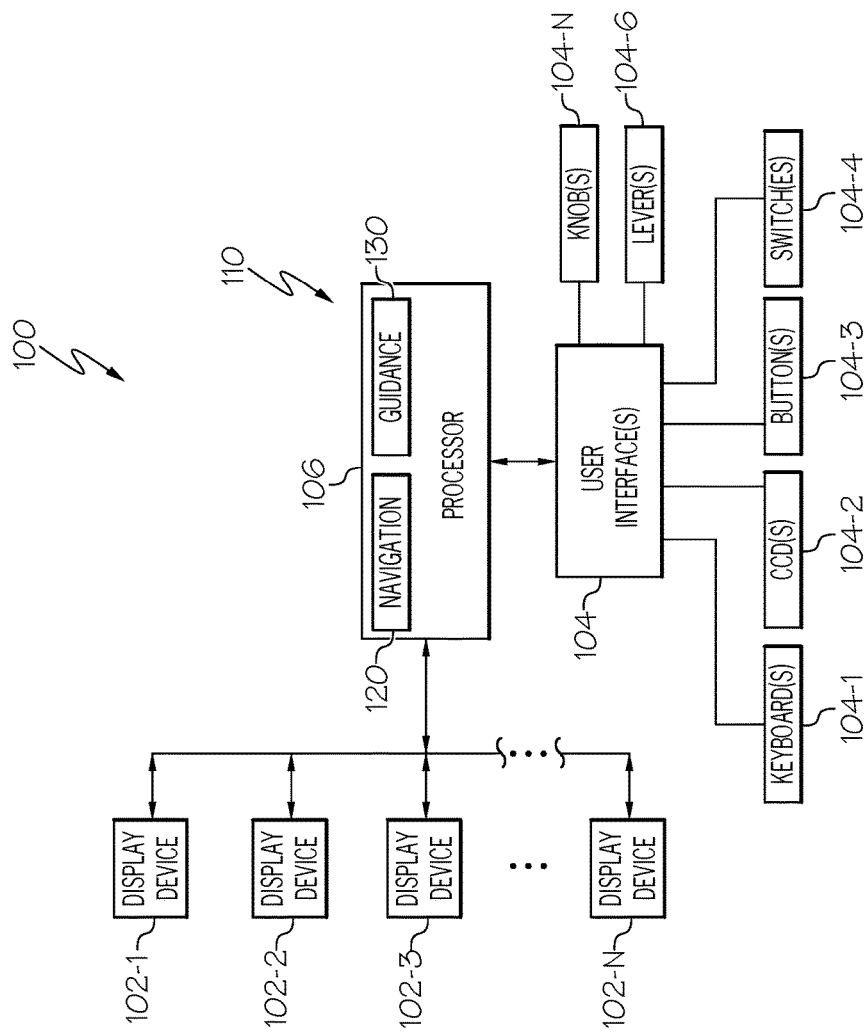
FIG. 1 is a functional block diagram of one embodiment of an aircraft system for providing autoflight capability feedback to a pilot.

Referring first to FIG. 1, a functional block diagram of one embodiment of an aircraft system 100 for providing autoflight capability feedback to a pilot is depicted, and includes a plurality of display devices 102 (102-1, 102-2 . . . 102-N), one or more user interfaces 104 (104-1, 104-2 . . . 104-N), and a processor 106. Each display device 102 is configured, in response to image rendering display commands received from the processor 106, to render various types of images. As will be described in more detail further below, the images may be rendered in both a nominal resolution and a degraded resolution. As used herein, the term "degraded resolution" is a resolution that is less than the nominal resolution.

The display devices 102 may vary in number, configuration, and implementation. For example, the display devices 102 may be configured as any one of numerous types of aircraft avionics displays including, but not limited to, a multi-function display (MFD), a primary flight display (PFD), a horizontal situation indictor (HSI), or an engine indications and crew alerting system (EICAS) display plurality of display devices, just to name a few. Moreover, the display devices may be implemented using any one of numerous types of display technologies including, but not limited to, various cathode ray tube (CRT) displays, various liquid crystal displays (LCDs), various light emitting diode (LED) displays, various plasma displays, various head down displays (HDDs), various projection displays, and various head up displays (HUDs), just to name a few. Regardless of the number, configuration, and implementation, The user interfaces 104 are configured to receive user input from a user such as, for example, a pilot. The user input may vary in type, but includes such data as a flight plan and various flight constraint values associated therewith. One or more of the user interfaces 104 may also be used to supply, in response to user input, various other types of signals. For example, and as will be described further below, one of the user interfaces 104 may be used to supply a first signal indicating a constraint selection function has been enabled, and the same or another user interface 104 may be configured to supply a second signal indicating that an autoflight armed function has been enabled.

Although the user interfaces 104 are, for clarity and ease of depiction, illustrated using a single functional block, it will be appreciated that the user interfaces 104 may be implemented using multiple user interfaces, which may vary in configuration and implementation, and may include any suitable hardware and software components that enable the pilot to interface with the system 100. As depicted, such components may include keyboards, cursor control devices, buttons, switches, levers, and knobs, just to name a few. One or more of the user interfaces 104 may also include a display unit capable of displaying various types of computer generated symbols and information, such as various CRT or flat panel display systems, such as LCDs, OLED displays, projection displays, plasma displays, HDDs, HUDs, and the like, and may be implemented as part of one or more if the display devices 102.

One or more of the user interfaces 104 may also be configured to supply haptic and/or aural feedback to the user (e.g., the pilot). For example, when implemented as a button, switch, lever, or knob, a user interface 104 may provide tactile feedback and/or aural (e.g., "click" sound) feedback when manipulated.

The processor 106 is in operable communication with the display devices 102 and the user interfaces 104. The processor 106 is coupled to receive various signals from one or more of the user interfaces 104 and is configured, in response to the received signals, to, among other functions, provide autoflight capability feedback. The autoflight capability feedback function will be described in more detail momentarily. Before doing so, however, it should be understood that although processor 106 is depicted in FIG. 1 using a single functional block, the exemplary embodiments are not so limited. Indeed, in some embodiments the processor 106 may be implemented using a plurality of processors, components, or subcomponents of various systems located either onboard or external to an aircraft. Furthermore, the systems and methods described herein are not limited to manned aircraft and can also be implemented for other types of vehicles, such as, for example, spacecraft or unmanned vehicles.

It should additionally be appreciated that the processor 106 may be configured to implement any one of numerous functions in an aircraft. In the depicted embodiment, however, the processor 106 is configured to implement a flight management system (FMS) 110. As is generally known, and as FIG. 1 further depicts, the FMS 110 includes a navigation system 120 and a guidance system 130. The system 100 is particularly discussed as controlling the aircraft during a vertical descent or deceleration segment, although the exemplary embodiments discussed herein are equally applicable to other flight segments and scenarios.

An FMS 110, as is generally known, is configured to perform a wide variety of in-flight tasks during operation of an aircraft. These tasks include aircraft navigation and guidance, which are implemented by the navigation system 120 and the guidance system 130, respectively. Although not specifically shown, the FMS 110 may additionally include a database with any elements necessary for the operation of the aircraft and the creation and implementation of a flight plan, including waypoints, airports, terrain information and applicable flight rules.

The navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, and any desired flight information.

The guidance system 130 uses various flight and engine models and algorithms to construct lateral and vertical profiles for various segments that make up a flight plan based on navigation information received from the navigation system 120 (e.g., the current position and velocity) and inputs from the pilot or other source (e.g., the desired destination). As examples, the guidance system 130 may generate the flight plan based on considerations for timing, position, altitude, speed targets, and fuel economy. The guidance system 130 may also consider aircraft-specific parameters such as weight, fuel, and atmospheric conditions. In one scenario, aspects of the flight plan may be dictated by Air Traffic Control (ATC), Federal Aviation Administration (FAA) rules, or European Aviation Safety Agency (EASA) rules.

The flight plan may include a number of segments between waypoints, each of which have an associated position, altitude, speed, and time that the aircraft is scheduled to fly. As such, the guidance system 130 generally constructs flight plan segments from a first state (e.g., a current or future location, altitude, speed and/or time) to a second state (e.g., a subsequent location, altitude, speed, and/or time). The guidance system 130 provides the flight plan in the form of guidance commands to, for example, a non-illustrated auto-pilot system. For example, the commands generated by the guidance system 130 associated with the flight plan may include pitch commands, pitch rate commands, roll commands, and speed targets that function to implement the lateral and vertical profiles. In response to these guidance commands, the auto-pilot system generates suitable actuator commands that function to control the flight characteristics of the aircraft via various non-illustrated actuators.

As noted above, the processor 106 is configured, in addition to the above-described functions, to implement a process that provides autoflight capability feedback to a pilot. This process, which is depicted in flowchart form in FIG. 2, includes the processor 106, in response to various signals received from the user interfaces 104, determining when a flight constraint value has been entered via one of the user interfaces 104 (202). The processor 106 then determines which of the images that are rendered on one or more of the display devices 102 are associated with the entered flight constraint value (204). After determining which of the rendered images are associated with the entered flight constraint value, the processor 106 commands one or more of the display devices 102 to render at least portions of the images associated with the flight constraint value in a degraded resolution (206). Before proceeding, it is once again noted that the term "degraded resolution" used herein is a resolution that is less than the nominal resolution of a display device 102.

The processor 106 then determines if both a constraint selection function and an autoflight armed function have been enabled (208, 210). If not, then the processor 106 continues to command the display devices 102 to render the images associated with the flight constraint value in a degraded resolution. If, however, the constraint selection function and autoflight armed function have both been enabled, the processor 106 commands the display devices 102 to render the images associated with the flight constraint value in the nominal resolution (212).

To implement the above-described process, the processor 106, as may be appreciated, is coupled to at least selectively receive, from one or more of the user interfaces 104, a constraint value signal, a first enable signal, and a second enable signal. The constraint value signal is representative of a flight constraint value, the first enable signal indicates a constraint selection function has been enabled, and the second enable signal indicates that an autoflight armed function has been enabled. It will be appreciated that the specific user interfaces 104 used to supply these signals may vary. It will additionally be appreciated that the images associated with an entered flight constraint value may vary.

Figure 2:
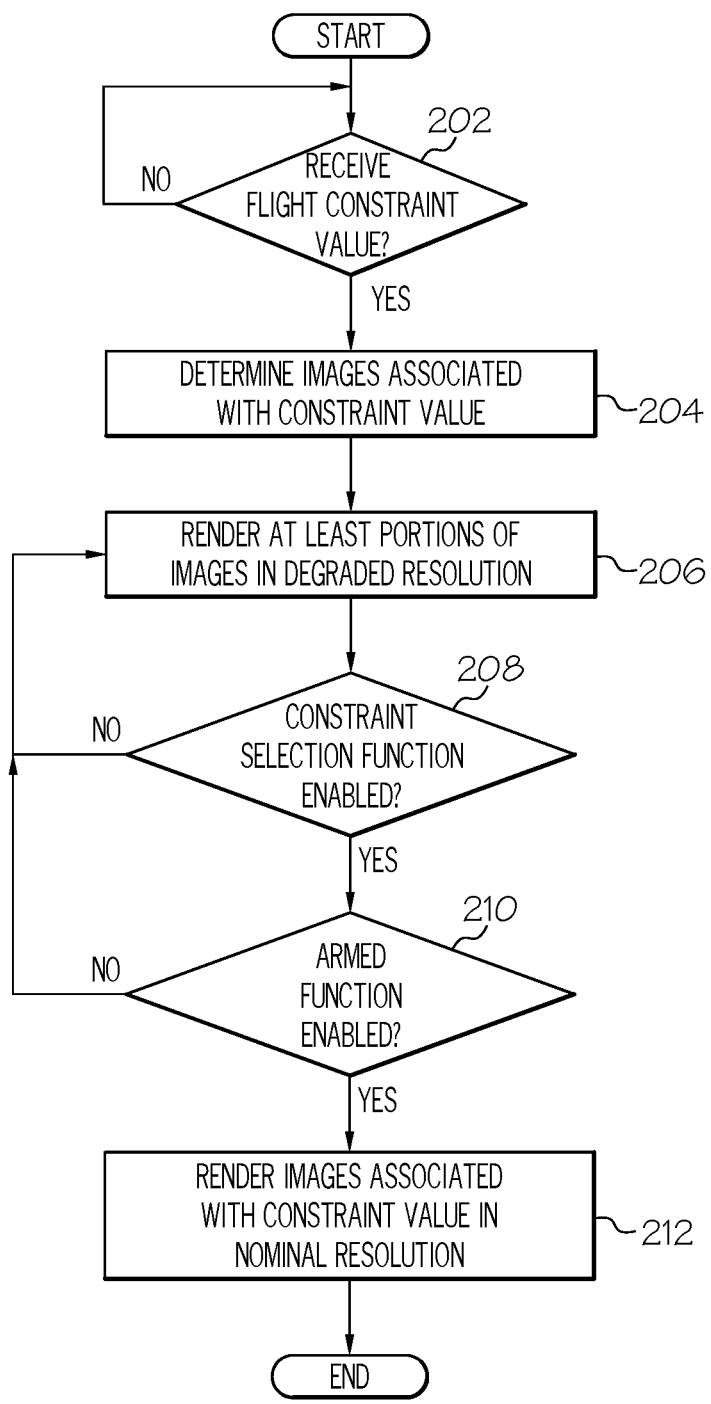
FIG. 2 depicts a process, in flowchart form, that may be implemented in the system of FIG. 1 for providing autoflight capability feedback.

To even more clearly describe and depict the autoflight capability feedback functionality of the system 100, one particular instantiation of the process depicted in FIG. 2 will now be described. This particular instantiation is associated with the setting of a descent target, enabling the navigation system 120, when armed, to attain the descent target, and arming the navigation system 120 to descend to target. For this particular instantiation, the flight constraint value entered by the aircraft pilot is a descent target (e.g., 14,000 feet) at a particular waypoint.

As FIG. 3 depicts, the processor 106 has determined that the images associated with this entered flight constraint value include at least the portion of the flight planning dialog box where the descent target is entered 302, an altitude display 304 adjacent the altitude select user interface (ASEL) 305, and the vertical situation display (VSD) 306, which depicts the vertical flight plan of the aircraft. As FIG. 3 also depicts, all or portions of these images 302, 304, 306 are rendered in a degraded resolution. For ease of illustration, dotted lines are used in the drawings to convey the degraded resolution. These images are rendered with sufficient resolution to provide clear readability, but the degraded resolution provides feedback to the pilot that something more needs to be done in order to attain the descent target.

As is generally known, after the descent target is entered, the ASEL 305 is turned to the altitude constraint (e.g., 14,000 feet), and then pressed to supply the first enable signal. Preferably, any tactile and/or aural feedback associated with the manipulation of the ASEL 305 is also degraded. That is, any tactile and/or aural click/tics are subtly degraded, relative to the nominal tactile and/or aural feedback, also hinting that the pilot needs to do more. Until the navigation system 120 is armed, for example by pressing VNAV on the appropriate user interface 104, the processor 106 additionally commands the VSD 306 to render, in the degraded resolution, the desired, maximum, and minimum descent path angles and rates that are possible to meet the constraint, along with the current flight path (showing that the flight path blows through the desired path), so the pilot remains aware of the window of possibility. As FIG. 3 also depicts, in some embodiments various other graphical elements, such as a vertical track alert (VTA) 308, and its associated sound, would be rendered in the degraded resolution until the navigation system 120 is armed.

When the pilot does press VNAV on the appropriate user interface 104, thereby arming the navigation system 120, this press is accompanied by nominal (as opposed to degraded) tactile and/or aural feedback, and, as FIG. 4 depicts, the flight planning dialog box 302, the altitude display 304, the flight plan on the VSD 306, and the VTA 308 (and all associated tactile and/or aural feedback) are all rendered in the nominal resolution.

The system and method described herein provides aircraft autoflight capability feedback to aircraft pilots to thereby prevent, or at least inhibit, latent errors of omission that may result in operational errors. The system and method uses graphics that communicate subtly and in the background, in a manner that naturally fits with how the visual cortex processes graphical information and how the mind makes quick, and subconscious judgments about information. The system may also use auditory and tactile feedback.

The degradations described herein cross modalities—thus aural alerts have a normal state and a degraded state, visual components have a normal state and a degraded state, and these are predicated on the underlying logic being satisfied, which could be several if-then-else statements (e.g., 1—constraint applied, 2—ASEL set, 3—VNAV armed). The degraded state also crosses all associated displays until the logic is satisfied, thus the flight crew would see the degraded stated across the flight deck, and have a greater opportunity to catch an error (e.g., 1—see it in the constraint GUI, 2—see it with ASEL).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing aircraft autoflight capability feedback to a pilot via a plurality of display devices that render images in a nominal resolution, the method comprising the steps of:
   determining, in a processor, when a flight constraint value has been entered via a user interface;

determining, in the processor, which images, rendered on the plurality of display devices, are associated with the flight constraint value;

rendering, on the plurality of display devices, at least portions of the images associated with the flight constraint value in a degraded resolution, the degraded resolution being less than the nominal resolution;

determining, in the processor, if both a constraint selection function and an autoflight armed function have been enabled; and rendering, on the plurality of the display devices, the images associated with the flight constraint value in the nominal resolution only when it is determined that both the constraint selection function and the autoflight armed function have been enabled, wherein the step of determining if both the constraint selection function and the autoflight armed function have been enabled comprises:

determining if a first additional user interface has supplied a first enable signal representative of the constraint selection function;

determining if a second additional user interface has supplied a second enable signal representative of the autoflight armed function, and wherein:

the first additional user interface comprises an altitude select (ASEL) function; and the second additional user interface comprises a vertical navigation (VNAV) select function.

2. The method of claim 1, further comprising:

generating, using the processor, feedback when a user operates the first additional user interface.

3. The method of claim 2, wherein:

the feedback is generated at either a nominal level or a degraded level;

the degraded level less than the nominal level; and the feedback is generated at the degraded level until it is determined that both the constraint selection function and the autoflight armed function have been enabled.

4. The method of claim 3, wherein the feedback is one or more of audible, visual, and tactile.

5. A system for providing aircraft autoflight capability feedback to a pilot, comprising:

a plurality of display devices, each display device configured to render images in a nominal resolution and a degraded resolution, the degraded resolution less than the nominal resolution;

a first user interface configured to receive user input representative of a flight constraint value;

an altitude select (ASEL) function user interface configured to supply a first enable signal indicating a constraint selection function has been enabled;

a vertical navigation (VNAV) select function user interface configured to supply a second enable signal indicating that an autoflight armed function has been enabled; and a processor in operable communication with the display devices, the first user interface, the ASEL function user interface, and the VNAV function user interface, the processor coupled to selectively receive the first enable signal from the ASEL function user interface indicating the ASEL function has been enabled, and the second enable signal from the VNAV function user interface indicating that the autoflight armed function has been enabled, the processor configured to:

determine when the flight constraint value has been entered via the first user interface, determine which images rendered on the plurality of display devices are associated with the entered flight constraint value, command the plurality of display devices to render at least portions of the images associated with the flight constraint value in the degraded resolution, determine when both the first enable signal and the second enable signal have been received, and command the plurality of display devices to render the images associated with the flight constraint value in the nominal resolution only when both the first enable signal and the second enable signal have been received.

6. The system of claim 5, wherein:

the processor is further configured to generate feedback when a user operates the ASEL user interface;

the feedback is generated at either a nominal level or a degraded level;

the degraded level less than the nominal level; and the processor generates feedback at the degraded level until both the first enable signal and the second enable signal have been received.

7. The system of claim 6, wherein the feedback is one or more of audible, visual, and tactile.

* * * * *